United States Patent [19]

Jerome

[11] Patent Number: 4,892,032
[45] Date of Patent: Jan. 9, 1990

[54] COOKING SPITS

[76] Inventor: Henry Jerome, 1689 Sherway Drive, Mississauga, Ontario L4X 1C8, Canada

[21] Appl. No.: 276,933

[22] Filed: Nov. 28, 1988

[51] Int. Cl.$^4$ .......................................... A47J 37/04
[52] U.S. Cl. .......................... 99/421 HV; 99/421 HH; 99/419; 126/25 A; 248/278
[58] Field of Search .................. 99/419, 421 R, 421 H, 99/421 HH, 421 HV, 446; 126/29, 25 A, 9 B; 248/278

[56] References Cited

U.S. PATENT DOCUMENTS

| | | | |
|---|---|---|---|
| 2,486,345 | 10/1949 | Triulzi | 99/421 HV |
| 2,881,656 | 4/1959 | Sutter | 248/278 X |
| 2,887,944 | 5/1959 | Walker | 99/421 HH |
| 3,001,751 | 9/1961 | Bozik | 248/278 X |
| 3,105,483 | 10/1963 | Bryan | 126/25 A X |
| 3,151,609 | 10/1964 | Hastings, Jr. | 126/25 A |
| 3,168,862 | 2/1965 | Clouser, Jr. | 99/421 HH |
| 4,436,024 | 3/1984 | Arden et al. | 99/421 HV |
| 4,469,019 | 9/1984 | Baer | 99/421 HV |
| 4,544,120 | 10/1985 | Lowell et al. | 248/278 X |
| 4,787,589 | 11/1988 | Willingham | 248/278 |

FOREIGN PATENT DOCUMENTS

| | | | |
|---|---|---|---|
| 1331397 | 4/1962 | France | 99/421 HV |
| 326897 | 2/1958 | Switzerland | 99/421 HV |
| 926692 | 5/1963 | United Kingdom | 99/421 HV |

Primary Examiner—Stephen Marcus
Assistant Examiner—Christine A. Peterson
Attorney, Agent, or Firm—Fetherstonhaugh & Co.

[57] ABSTRACT

A portable cooking apparatus has a pair of longitudinally elongated stanchions, a spit rod support and a motor support bracket for supporting a drive motor with its power output shaft aligned with the spit rod. A mounting bracket connects the first spit rod support member and the motor support bracket and provides freedom of movement of the motor support bracket with respect to the spit rod support member about pitch and yaw axes which serve to permit the motor support bracket to move with respect to its associated station to be aligned with the power output shaft of the motor and the spit rod in use.

6 Claims, 4 Drawing Sheets 4,892,032

1

COOKING SPITS

BACKGROUND OF THE INVENTION

This invention relates to portable cooking spits. In particular, this invention relates to a portable cooking spit in which the spit shaft is to be rotatably driven by a motor. Electric motors are frequently used to drive the spit of a barbecue such as a portable barbecue. With the smaller type portable barbecues, the electric motor is mounted on the wall of the barbecue and the spit is supported in notches on the opposite side walls of the barbecue. With larger barbecues, the electric motors are mounted on integral framed structures that also support both ends of the spit. In both these barbecue sizes, the motor supports and spit rod supports are aligned and in a fixed position relative to one another and therefore integrally tied together.

With the larger barbecues designed to support larger pieces of meat weighing up to 100 lbs., the difficulty has been in portability as the larger barbecues require a larger frame structure, thus making it heavier, bulkier and more awkward to handle as well as more expensive to manufacture.

In order to overcome this difficulty, the present cooking apparatus provides a mounting device for mounting the motor support bracket for movement about generally vertical and generally horizontal axes such that the power output shaft of the motor can be aligned with the spit rod regardless of the position of the spit rod supports. The frame structure tying together the spit rod supports and the motor are therefore n longer required. Removing this frame structure makes the barbecue less bulky, its operation more versatile and its manufacturing less expensive. With large barbecues, difficulty has also been experienced in attempting to adjust the height of the spit rod with respect to the heat source.

This difficulty has been overcome in the present apparatus by providing spit rod support members which are slidably mounted on support stantions and which are supported by height setting chains which are releaseably mounted in slots formed in the upper end of the stantions.

SUMMARY OF INVENTION

According to one aspect of the present invention, there is provided a cooking apparatus comprising a pair of longitudinally elongated stanchions, a spit rod support member mounted on each stanchion , each spit support member being formed to provide a seat for supporting a spit for rotation thereon about a first longitudinal axis which extends transversly between the seats in use, a motor support bracket for supporting a drive motor with its power output shaft aligned with said first longitudinal axis, mounting means connecting said first spit rod support member and said motor support bracket and providing freedom of movement of the motor support bracket with respect to the spit rod support member about generally vertical and generally horizontal axes which serve to permit the motor support bracket to move with respect to its associated stantion to be aligned with the power output shaft of the motor and the spit rod in use.

According to a further aspect of the present invention, there is provided a portable cooking apparatus comprising a pair of longitudinally elongated stanchions, a spit rod support member slidably mounted on

2 each stanchion for longitudinal movement therealong, each spit support member being formed to provide a seat for supporting a spit for rotation thereon about a first longitudinal axis which extends transversly between the seats in use, height setting means communicating between each spit rod support member and its associated stanchions for setting the height of each rod support member with respect to its associated stanchions, a motor support bracket for supporting a drive motor with its power output shaft aligned with said first longitudinal axis, mounting means communicating between said first spit rod support member and said motor support bracket to provide freedom of movement of the motor support bracket with respect to the spit rod support member about generally vertical and generally horizontal axes which serve to permit the motor support bracket to gyrate with respect to its associated stantion to maintain the alignment of the power output shaft of the motor and the spit rod in use.

Brief Description of the Drawings

The invention will be more clearly understood after reference to the following detailed specification read in conjunction with the drawings wherein;

With reference to FIG. 1 of the drawings, the reference numeral 8 refers generally to a portable cooking apparatus constructed in accordance with an embodiment of the present invention.

Figure 1:
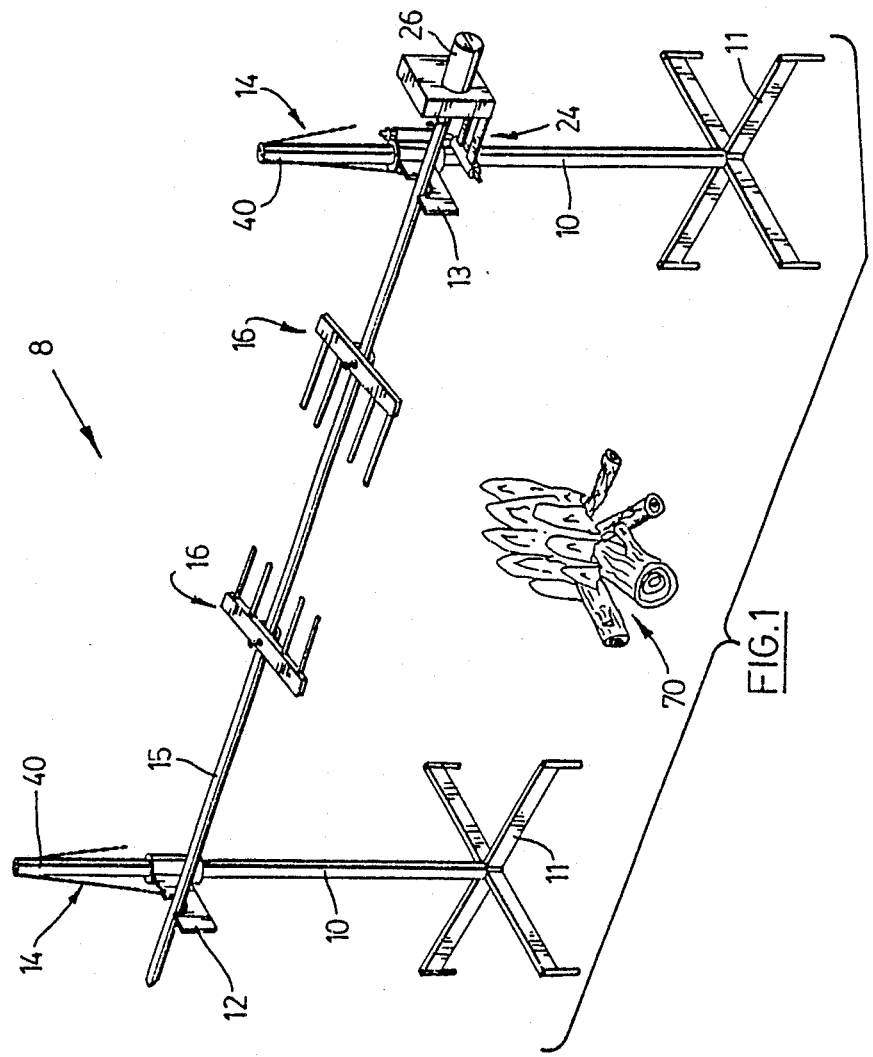
FIG. 1 is a pictorial view of a portable cooking apparatus constructed in accordance with an embodiment of the present invention.

The apparatus 8 includes a pair of longitudinally elongated stantions 10 each of which is supported in an upright position by means of a base 11. Each of the stantions 10 consists of a hollow tubular metal rod which has an upper end 40.

A spit rod support member 1 is mounted on one of the stantions 10 and a spit rod support member 13 is mounted on the other. Each of the spit rod support members consists of a tubular sleeve 18 and a support plate 42 which projects radially from the sleeve 18. The sleeve 18 has a bore which is proportioned to receive the stantion 10 in a free-fitting, sliding relationship. The support plates 42 each have U-shaped notches 44 formed in their upper edge. A bearing support 17 (FIG. 2) is mounted in each notch 44 and serves to provide a support surface which has a low coefficient of friction.

The spit rod support member 12 is fitted with a coupling member 19 which comprises a rod 46 which is secured to the sleeve 18. The rod 46 has an upper end portion 48 which projects upwardly and forwardly from the sleeve in the direction of the support plate 42. A U-shaped bracket 50 is mounted on the rod 46 and a further U-shaped bracket 52 is mounted on the upper end portion 48.

Figure 3:
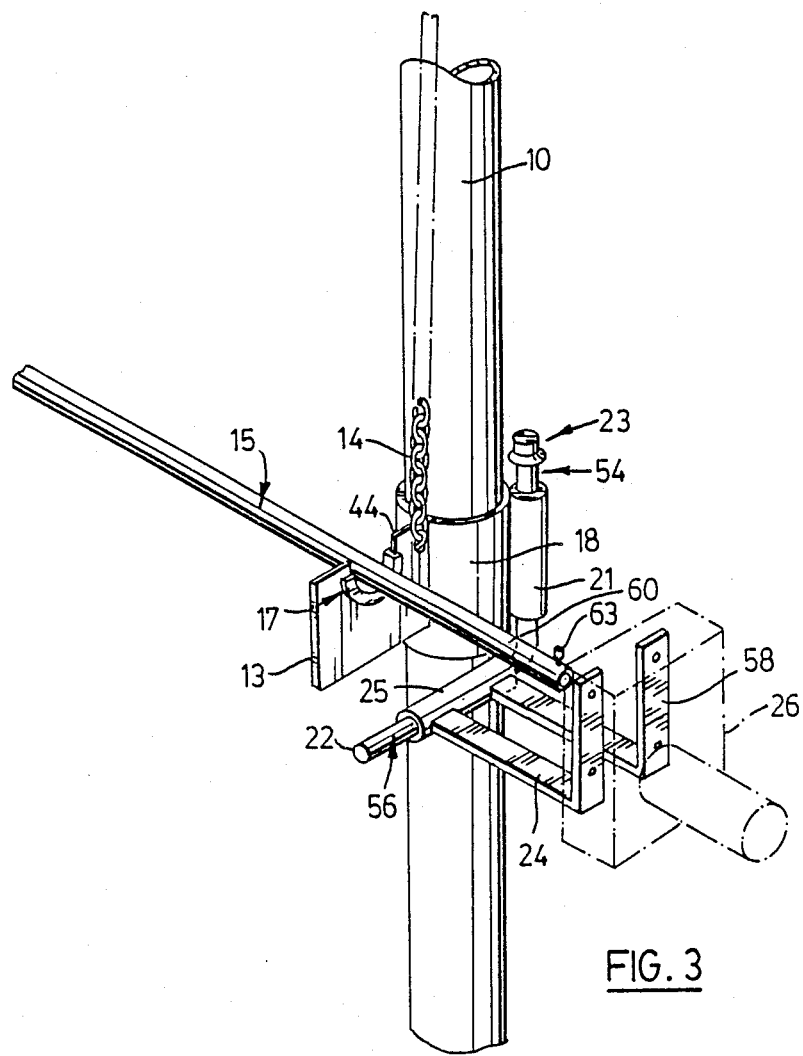
FIG. 3 is a pictorial view of a stantion having a spit rod support member mounted thereon to which the motor support bracket is attached.

A small tubular sleeve 21 is mounted on the sleeve 18 of the spit rod support member 13. As shown more clearly in FIG. 3 of the drawings, an L-shaped rod 22 has an upright portion 54 which is pivotally mounted in the sleeve 21 for rotation about an axis which extends parallel to the station 10. Locking cap 23 prevents upper rod 54 from slipping out of sleeve 21. The L-shaped rod 22 has a horizontal portion 56 which extends at right angles to the upright portion 54. The motor support bracket 24 is formed with a tubular sleeve portion 25 which is mounted on the horizontal portion 56 of the L-shaped rod 22 so as to be free to rotate thereon. The motor support bracket 24 also has a pair of L-shaped arms 58 which are mounted on and project outwardly from the sleeve 25 and are suitable for use in supporting a drive motor assembly 26.

Figure 2:
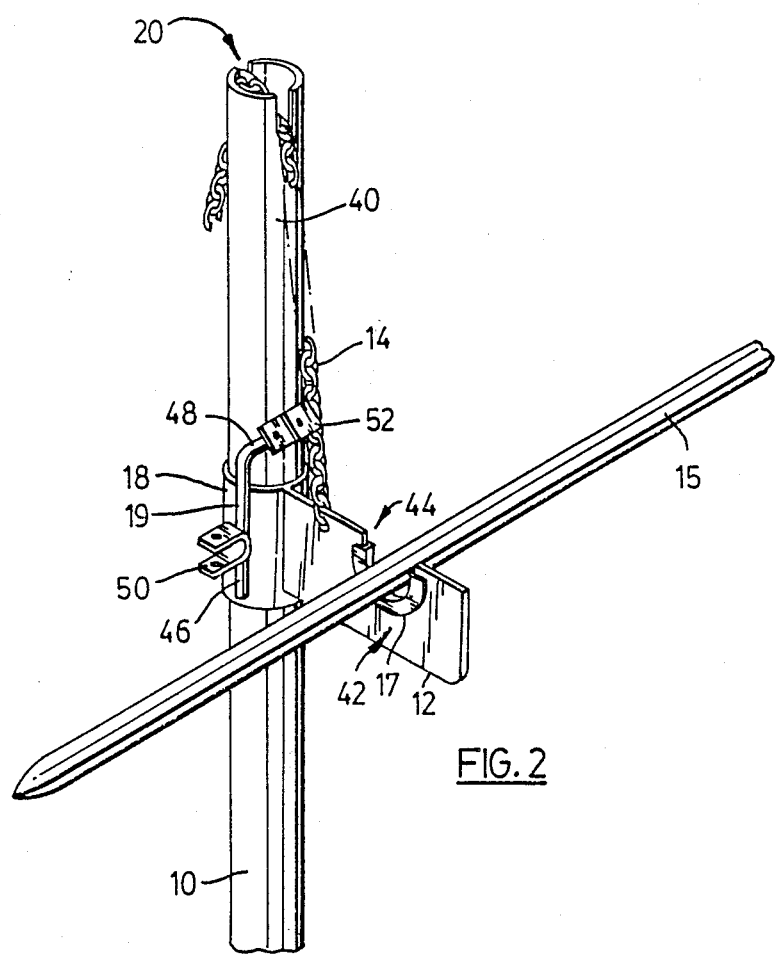
FIG. 2 is an enlarged detail showing the upper end of a stantion and a spit rod support member supporting an end of a spit rod.

The spit rod support members 12 and 13 are each suspended from their associated station 10 by means of a chain 14. The chain 14 is of a conventional construction in which adjacent links are looped through one another so that they will normally extend at right angles to one another. Each of the stantions 10 is formed with a pair of notches 20 which extend downwardly from the upper end thereof. The notches 20 are proportioned so as to be sufficiently wide to permit the links of the chain 14 to pass downwardly into the slots while preventing lengthwise movement of the chains through the slots when seated therein. This is achieved by reason of the fact that the slots 20 are narrower than the maximum width of the individual links while being wider than the thickness of the individual links. In addition, because adjacent links normally extend at right angles to one another, each successive link serves to form shoulders which extend outwardly from each side of the preceding link and these shoulders bear against the sides of the notches to prevent passage of the chains therethrough. The fact that the stantions are made from hollow, tubular members which provide two notches 60 adds to the security with which the chains are anchored. In order to raise or lower the brackets 12 and 13, it is merely necessary to unseat the chain 14 from the notches 60 and in order to set the height of the spit rod support members, it is merely necessary to seat the links of the chain 14 in the slots 60 as illustrated in FIG. 2.

The spit rod 15 is in the form of an elongated rod which has a circular cross-section. Preferably, the rod 15 measures in excess of 36" and may measure up to 7' in length or more. Skewers 16 are detachably mounted on the spit rod 15 as shown in FIG. 1 of the drawings.

One end 60 of the rod is formed with a socket to accept the output shaft of the motor assembly 26. The motor shaft and spit rod are detachably secured by means of locking screw 63.

To permit the spit rod 15 to be manually rotated, a manually engageable handle 62 is provided. The handle 62 comprises a sleeve 27 which is proportioned to fit on the spit rod 15 in a close fitting sliding relationship. Handles 29 extend radially outwardly from the sleeve 27 and are secured thereto as by welding or the like. A locking screw 28 is threadedly mounted in the sleeve 27 and may be tightened to bear against the spit rod 15 to secure the handle against rotation with respect to the spit rod 15.

The handle 62 may also be used for the purposes of securing the spit rod 15 against rotation about its longitudinal axis. This is achieved by positioning one of the arms 29 of the handle in one or other of the U-shaped brackets 50 or 52. A locking pin 64 may be mounted in the passages which are formed in the arms of the brackets 50 and 52 to retain the arm 29 of the handle therein. The brackets 50 and 52 are circumferentially spaced about the axis of the spit rod 15 at 45° angles with the result that these brackets are capable of cooperating with the four handles 29 to lock the spit at 45° intervals.

In use, the portable cooking apparatus of the present invention is positioned with the stantions 10 arranged in a generally upright configuration, one on either side of a heat source such as the barbecue pit 70 illustrated in FIG. 1 of the drawings. While it is preferable to mount the stantions 10 so that they are substantially vertically oriented, true vertical orientation is not essential. The spit rod support members 12 and 13 are positioned to support the spit rod 15 at a predetermined height above the heat source and are usually arranged so that the spit rod 15 extends in a generally horizontal plane. Again, however, true horizontal alignment is not essential because of the freedom of movement provided by the mounting means which supports the motor. The spit 15 is then mounted so that it bridges between the spit rod support members 12 and 13 and is seated in the notches 44. The socket end 60 of the spit rod is then slid over the motor output shaft and secured by locking screw 63 so that the shaft can be rotatably driven by the motor. The output shaft of the motor can be aligned with the shaft by reason of the freedom of movement of the motor support bracket. More often than not, the notches 44 of the spit rod support members 12 and 13 will not be accurately aligned with one another either horizontally or vertically. However, the fact that the mounting means which connects the motor support bracket to the spit rod support member 13 is designed to make allowances for movement of the motor support bracket about both the vertical and horizontal axes, it is possible to couple the spit 15 to the motor so that the spit 15 can be rotatably driven by the motor.

Figure 4:
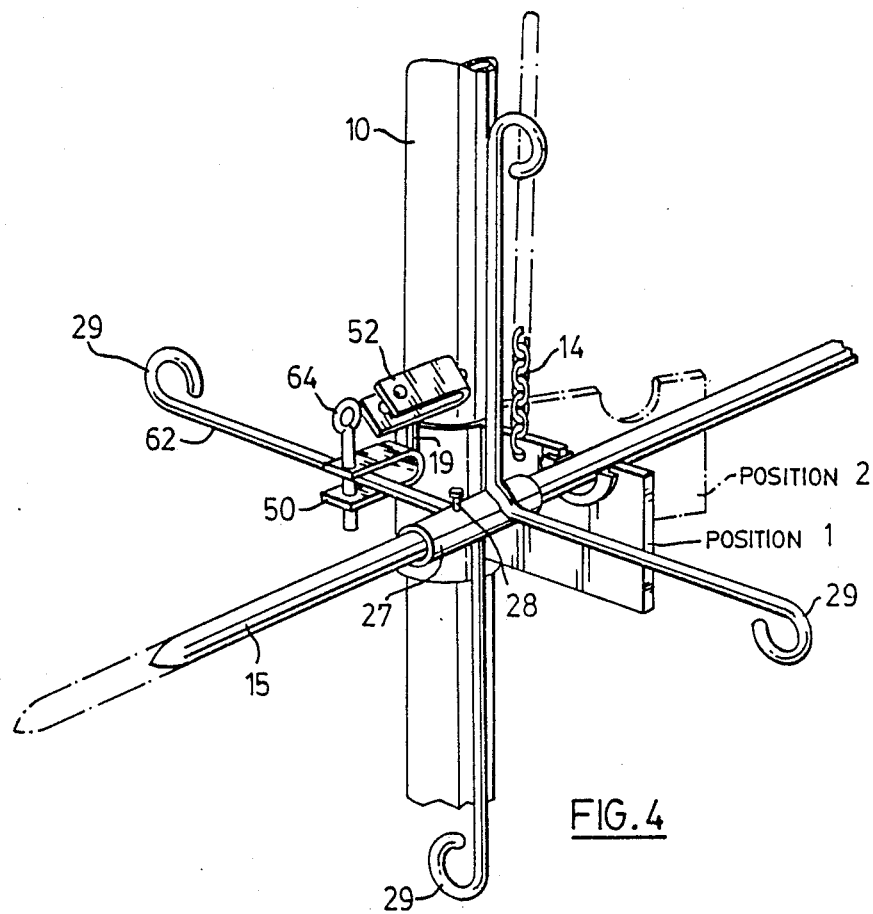
FIG. 4 is a pictorial view of a portion of a stantion similar to FIG. 2 showing the manner in which a manually engageable handle may be locked against rotation.

When the spit is to be manually rotated, the handle 27 is mounted on a spit as illustrated in FIG. 4 of the drawings and the spit is moved lengthwise so as to be disconnected from the motor and so as to position the handle 27 so that it is free of engagement with respect to the U-shaped brackets 50 and 52. By manually rotating the handle 62 it is then possible to rotate the spit 15 independently of the operation of the motor. It is possible to lock the spit in any one of eight angular positions spaced from one another at 45° intervals by mounting one of the handles 29 in one or other of the brackets 50,52.

It is also possible to adjust the height of the support brackets 12 and 13 by releasing the chain 14 as previously described and raising or lowering the support brackets with respect to the stantions 10 as required.

From the foregoing, it will be apparent that the present invention provides a simple and inexpensive portable cooking apparatus.

I claim:
1. A portable cooking apparatus comprising:
 (a) a pair of longitudinally elongated stanchions which are free of attachment to one another so as to be independently positioned in a generally upright manner in use,
 (b) a spit rod support member mounted on each stanchion, each spit support member being formed to provide a seat for supporting a spit for rotation thereon about a first longitudinal axis which extends transversly between the seats in use,
 (c) a motor support bracket for supporting a drive motor with its power output shaft aligned with said first longitudinal axis,
 (d) mounting means connecting said first spit rod support member and said motor support bracket and providing simultaneous freedom of movement of the motor support bracket with respect to the spit rod support member about a generally vertical and generally horizontal axis which serve to permit the motor support bracket to move simultaneously about the vertical and horizontal axes with respect to its associated stanchion to be aligned with the power output shaft of the motor and the spit rod in use.

2. A portable cooking apparatus as claimed in claim 1 wherein said mounting means comprises an L-shaped member which has first and second shaft portions extending at right angles to another, said first shaft portion being mounted on said first spit rod support member for rotation about said generally vertical axis, said second shaft portion being mounted on said motor support bracket so as to permit the motor support bracket to pivot about said generally horizontal axis.

3. A portable cooking apparatus as claimed in claim 1, wherein each stanchion has an upper end, a suspension retaining notch formed in the upper end of each stanchion, each spit rod support member being slidably mounted on its associated stanchion for up, and down and rotational movement, a flexible suspension member for each spit rod support member, each flexible suspension member having one end connected to its associated spit rod support member and extending upwardly therefrom and having a portion of its length releaseably retained in said retaining notch.

4. A portable cooking apparatus as claimed in claim 1, further comprising a spit rod, a manually engageable handle mounted on said spit rod said handle having arms which project radially outwardly from the split rod, said arms being manually engageable when the spit rod is operably mounted on the spit rod support members to permit manual rotation on the spit rod.

5. A portable cooking apparatus as claimed in claim 4, further comprising coupling means for releaseably securing the manually engageable arms with respect to one of said spit rod support members to lock the handle against rotation.

6. A portable cooking apparatus comprising:
(a) a pair of longitudinally elongated stanchions which are free of attachment to one another so as to be independently positioned in a generally upright manner in use,
(b) a spit rod support member slidably mounted on each stanchion for longitudinal movement along and rotation movement around each stanchion, each spit support member being formed to provide a seat for supporting a spit for rotation thereon about a first longitudinal axis which extends transversly between the seats in use,
(c) height setting means communicating between each spit rod support member and its associated stanchions for setting the height of each rod support member with respect to its associated stanchions,
(d) a motor support bracket for supporting a drive motor with its power output shaft aligned with said first longitudinal axis,
(e) mounting means communicating between said first spit rod support member and said motor support bracket to provide simultaneous freedom of movement of the motor support bracket with respect to the spit rod support member about generally vertical and generally longitudinal axes which serve to permit the motor support bracket to move with respect to its associated stantion to maintain the alignment of the power output shaft of the motor and the spit rod as the end of the spit rod to which the output shaft of the motor is attached is caused to gyrate in use.

* * * * *